United States Patent
Yount et al.

(10) Patent No.: US 6,443,399 B1
(45) Date of Patent: Sep. 3, 2002

(54) FLIGHT CONTROL MODULE MERGED INTO THE INTEGRATED MODULAR AVIONICS

(75) Inventors: Larry Yount, Scottsdale; John Todd, Glendale, both of AZ (US)

(73) Assignee: Honeywell International Inc., Morristown, NJ (US)

(*) Notice: Subject to any disclaimer, the term of this patent is extended or adjusted under 35 U.S.C. 154(b) by 68 days.

(21) Appl. No.: 09/616,196

(22) Filed: Jul. 14, 2000

(51) Int. Cl.$^7$ ................................................ B64C 13/00
(52) U.S. Cl. ........................................ 244/196; 244/221
(58) Field of Search ............................ 244/75 R, 76 R, 244/221, 227, 229, 195–197

(56) References Cited

U.S. PATENT DOCUMENTS

| | | | | |
|---|---|---|---|---|
| 3,679,156 A | * | 7/1972 | Redmond, Jr. | 244/75 R |
| 3,905,241 A | * | 9/1975 | Downing et al. | 244/75 R |
| 4,150,686 A | * | 4/1979 | El Sherif et al. | 91/363 A |
| 4,244,277 A | * | 1/1981 | Avis | 91/363 A |
| 4,472,780 A | * | 9/1984 | Chenoweth et al. | 244/194 |
| 4,567,813 A | | 2/1986 | Garnjost | |
| 4,807,516 A | | 2/1989 | Takats | |
| 4,887,214 A | | 12/1989 | Takats et al. | |
| 5,036,469 A | | 7/1991 | Pelton | |
| 5,374,014 A | | 12/1994 | Traverse et al. | |
| 5,670,856 A | | 9/1997 | Le et al. | |
| 5,764,502 A | * | 6/1998 | Morgan et al. | 307/82 |
| 5,806,805 A | | 9/1998 | Elbert et al. | |
| 5,823,468 A | * | 10/1998 | Bothe | 244/25 |

FOREIGN PATENT DOCUMENTS

| | | |
|---|---|---|
| DE | 23 63 801 | 6/1975 |
| EP | 0 573 106 A1 | 12/1993 |
| JP | 08020394 | 1/1996 |

OTHER PUBLICATIONS

Todd, John R. et al., "Integrating Controls and Avionics On Commercial Aircraft," May 1992, IEEE 1992 National Aerospace and Electronics Conference NAECON 1992, pp. 46–62.

J}Lich, Gabriele, International Search Report, Nov. 19, 2001.

* cited by examiner

Primary Examiner—Galen L. Barefoot

(57) ABSTRACT

In an aircraft using fly-by-wire technology, the flight control functions have been integrated into the integrated modular avionics ("IMA"). The new flight control module ("FCM") resides on the same data bus as the other modules in the IMA and receives power from the same power supply. In addition, the FCM is also connected to a separate power supply to add redundancy to the system. Several benefits arise from this configuration of an FCM. There is no longer a separate chassis needed for the flight control functions, thus resulting in a reduction in weight. In addition, the FCM now has access to all of the data on the IMA bus, instead of a limited amount of data over an ARINC 629 bus. The FCM provides augmentation signals to the actuator control electronics ("ACE") to aid in the flying of the aircraft. In the event of a failure of the FCM, the ACE still provides enough control to fly the airplane.

4 Claims, 4 Drawing Sheets

FLIGHT CONTROL MODULE MERGED INTO THE INTEGRATED MODULAR AVIONICS

BACKGROUND OF THE INVENTION

1. Technical Field

The present invention relates to aircraft electronics, and more particularly to an integrated modular avionics package that integrates a flight control module.

2. Background Information

Referring to FIG. 1, a typical airplane includes fuselage 110, which holds the passengers and the cargo; wings 112, which provide the lift needed to fly the airplane; vertical stabilizer 114 and horizontal stabilizers 116, which are used to ensure a stable flight; and engines 118, which provide the thrust needed to propel the airplane forward.

To guide an airplane, one must rely on flight control surfaces that are placed on wings 112, horizontal stabilizers 116, and vertical stabilizers 114. The primary flight control surfaces on an airplane include the ailerons 100, the elevators 102, and the rudder 104. Ailerons 100 are located on the trailing edges of the wings of the airplane and control the roll of the airplane. Rolling of an airplane is depicted in FIG. 2A. Elevators 102 are located on the horizontal stabilizer of an airplane and control the pitch of the airplane. Pitching of an airplane is depicted in FIG. 2B. Rudder 104 is located on the vertical stabilizer and controls the yaw of the airplane. Yawing of an airplane is illustrated in FIG. 2C.

Also present on the wings of an airplane are spoilers 106, flaps 120, and slats 122, collectively known as secondary flight control surfaces. Spoilers 106 are located on the wings and perform a variety of different functions, including assisting in the control of vertical flight path, acting as air brakes to control the forward speed of the airplane, and acting as ground spoilers to reduce wing lift to help maintain contact between the landing gear and the runway when braking.

Flaps 120 and slats 122 are located on the wings of an airplane to change the lift and drag forces effecting an airplane, with flaps 120 at the trailing edge of wing 112 and slats 122 at the leading edge of wing 112. When flaps 120 and slats 122 are extended the shape of the wing changes to provide more lift. With an increased lift, the airplane is able to fly at lower speeds, thus simplifying both the landing procedure and the take-off procedure.

The primary flight control surfaces described above are operated by a pilot located in the cockpit of the airplane. Rudder 104 is typically controlled by a pair of rudder pedals operated by the pilot's feet. Ailerons 100 are controlled by adjusting a control stick to the left or right. Moving the control stick to the left typically controls the left aileron to rise and the right aileron to go down, causing the airplane to roll to the left. Elevator 102 is controlled by adjusting a control wheel or control stick to the front or back.

In most smaller airplanes, there is a direct mechanical linkage between the pilot's controls and the moveable surfaces. In most larger airplanes, there may be cables or wires connecting the pilot's controls to the hydraulic actuators used to move the primary control surfaces. In newer planes, a system called "fly-by-wire" has been developed.

In a typical, prior art, fly-by-wire airplane, electronic sensors are attached to the pilot's controls. These sensors transmit electronic data to various flight control computers ("FCC"). A system known as the actuator control electronics ("ACE") receives the electronic signals from the flight control computer and move hydraulic actuators based on the received signals. Each hydraulic actuator is coupled to a moveable primary control surface such that movement of the actuator moves the primary control surface.

The fly-by-wire concept results in a savings of weight as there is no longer a need for heavy linkages, cables, pulleys, and brackets running throughout the airplane to control the actuators, only electrical wiring to the FCC and the ACE. Furthermore, this concept may result in a smoother flight, with less effort needed by the pilot.

During aircraft operation, the pilot of the airplane may need certain pieces of data to assist in flying the airplane. This data includes air speed, altitude, weather, location, heading and other navigational data. The data is generated by sensors located in various parts of the aircraft. The systems used to generate and report this and other information management data is generally termed "avionics." The term "avionics" also encompasses auto-pilot functions, which allow a computer to make inputs to the pilot's controls. In modern fly-by-wire airplanes, the avionics systems may be placed in a cabinet in order to share, for example, power supplies, processors, memory, operating systems, utility software, hardware, built-in test equipment, and input/output ports. This grouping of avionics is known in the art as integrated modular avionics ("IMA").

The IMA gathers and process data for a number of functions, including, but not limited to, flight management, displays, navigation, central maintenance, airplane condition monitoring, flight deck communications, thrust management, digital flight data, engine data interface, automatic flight, automatic throttle, and data conversion.

The original concept behind the IMA was the elimination of the need for line replaceable units (LRU) for each subsystem, each with its own power supply, processor, chassis, operating system, utility software, input/output ports, and built-in test units. Each of these functions were shared by the IMA, resulting in a great weight savings.

In a typical fly-by-wire controlled airplane, the movements of the control stick must be translated into the appropriate electronic instructions that can be executed by the ACE. In the prior art, this translation was performed by the FCC. The prior art separated the FCC from the IMA and combined the FCC with the ACE.

When a new airplane is designed and built, and before it can be flown with passengers, it must be certified. In the United States, the Federal Aviation Regulations ("FAR") govern the certification of planes. The FAR regulates potential problems that may occur in an airplane and divides components into various categories depending on the criticality of the component. For example, a Category A component is a component that, if it fails, results in loss of aircraft. A Category A component is also known as a Critical component. A Category B component is a less important component: failure of a Category B component may result in the loss of life, but not the loss of the entire airplane. Components in Categories C, D, and E are even less critical: failure any of those components results in no loss of life.

Critical components can be broken up into full-time critical and part-time critical components. A component is considered full-time critical if it is critical (i.e., loss of airplane can result if the component fails) in every flight for the duration of each flight. A system is considered part-time critical if it is critical for only a short period of time during each flight. For example, stall protection is critical at low altitudes because stall protection lowers the nose of the airplane, which can result in the loss of the airplane at low altitude. However, stall protection at cruising altitude is not critical because lowering the pitch of the airplane at 31,000 feet is not inherently dangerous. A system is also considered part-time critical if the condition or system is critical but does not happen in every flight (for example, the loss of an engine).

For full-time critical components operated by software, "similar redundancy" (also known as "design diversity") is standard. In similar redundancy, two computing systems are employed in the airplane that are similar, but not identical, to each other. For example, two computing channels could be used, with each computing channel having a different CPU and different software. In the alternative, the same CPU might be used for each computing path, but different software (for example, developed by a separate group of programmers) would be used. The theory behind similar redundancy is that, if one of the computing lanes makes a mistake, it is unlikely that a second computing lane, performing the same function but in a different manner, would contain the same fault that occurs at the same place.

Such a similar redundancy scheme results in increased development costs, because the same software program must be developed twice. However, the FAR only require that full-time critical components have similar redundancy. There is no such requirement for part-time critical components.

The IMA of the prior art did not include an FCC, because some argue that the critical components and the non-critical components should not be placed in the same IMA housing or cabinet, to avoid having the failure of a non-critical component effect the availability of a critical component. Because the Flight Control Computer directly controlled the primary control surfaces, the Flight Control Computer was Critical in the prior art. Therefore, the prior art placed the Flight Control Computers in a separate module to ensure that the failure of the IMA would not result in the failure of the primary flight control surfaces.

There are several disadvantages to this approach. The first disadvantage is the added development cost because of the need for similar redundancy. The development costs for the software is almost doubled because the software must be developed twice. Furthermore, there is extra weight on the airplane because of the need for a separate Flight Control Computer with a separate power supply and separate processing capabilities. The separation of the FCC results in another disadvantage because of the way a typical FCC communicates with the IMA over a standard ARINC 629 bus. The ARINC 629 bus is slower than the bus internal to the IMA. Thus, for the IMA to transmit data to the FCC as it is being processed, either less data must be transmitted, or the same data must be transmitted over a longer period of time. Because of the importance of receiving information in a timely manner, prior art designers chose to transmit less data. Therefore, a separate FCC does not receive the full flight information generated by the IMA. What is needed is a system that alleviates or eliminates these problems.

SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention incorporates a flight control module into the avionics of an airplane. The flight control module is coupled to an actuator control electronics system which operates a hydraulic actuator coupled to a flight control surface. The flight control module provides augmentation information to the actuator control electronics system. However, in the actuator control electronics system is also capable of operating based solely from inputs provided by a pilot through a control stick, without any such augmentation from the flight control module in a "direct mode."

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only, because various changes and modifications within the spirit and scope of the invention will become apparent to those of skill in the art from the detailed description of the invention and claims that follow.

BRIEF DESCRIPTION OF THE DRAWINGS

The invention is further described in connection with the accompanying drawings, in which.

DETAILED DESCRIPTION OF THE INVENTION

Figure 1:
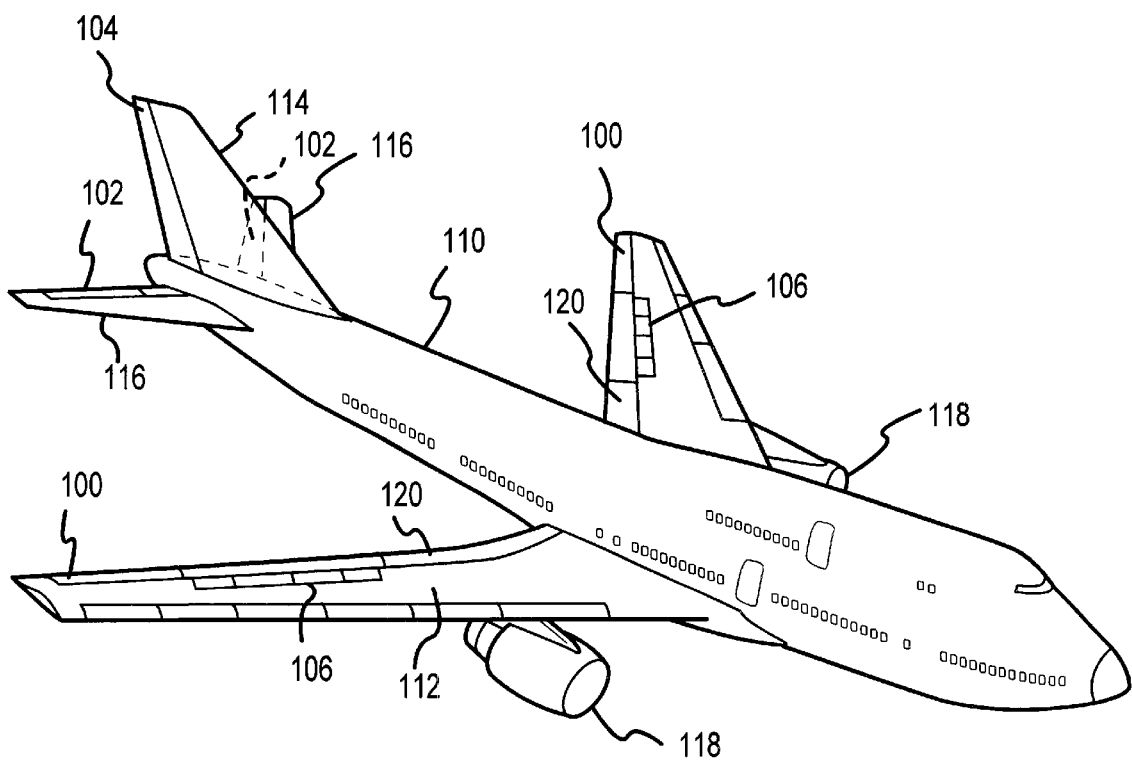
FIG. 1 shows an exemplary airplane in a perspective view.
Figure 2A:
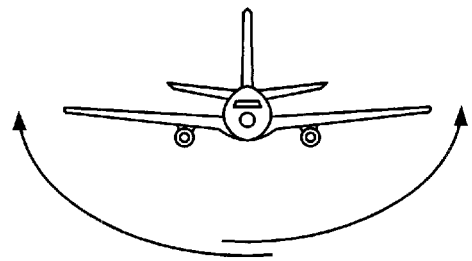
FIGS. 2A, 2B, and 2C show the three axes about which an airplane can be controlled.
Figure 2B:
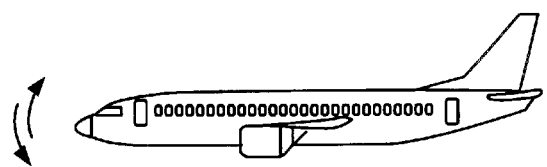
Figure 2C:
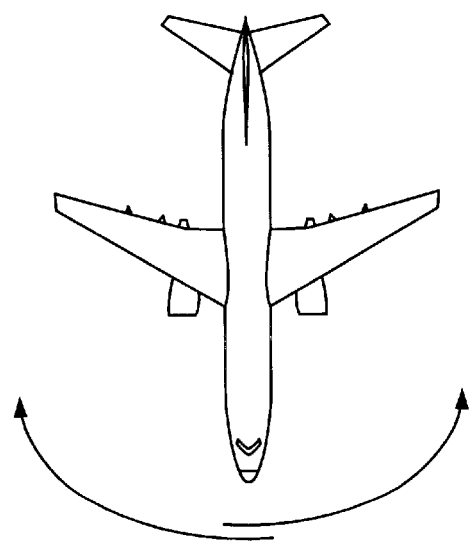
Figure 3:
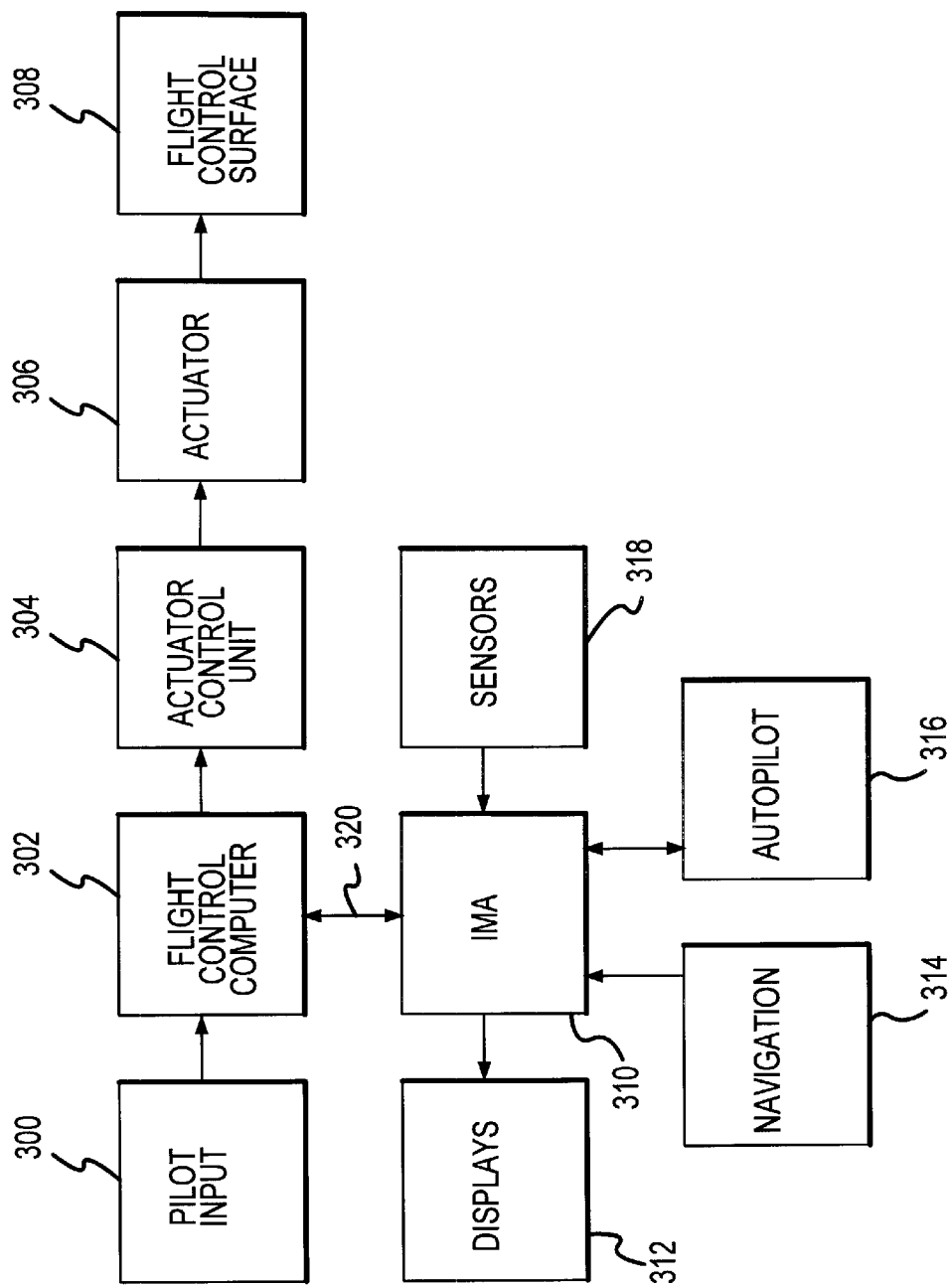
FIG. 3 shows a prior art flight control computer integration in block diagram format.

A previous flight control computer is illustrated in FIG. 3. The pilot provides inputs, at pilot input 300, through the use of such components as rudder pedals and a control stick. These inputs are converted to electrical signals and transmitted to flight control computer 302. Flight control computer 302, being a Critical component, usually contains two separate computing lanes to satisfy the similar redundancy requirement described above. Flight control computer 302 processes the signals from pilot input 300 and translates the signals for use by actuator control unit 304, which transmits signals to actuator 306 to move flight control surface 308. It should be remembered that there are typically at least five flight control surfaces on a typical airplane (one aileron on each wing, one elevator on each horizontal stabilizer, and one rudder on the vertical stabilizer) and each flight control surface typically has two or three actuators controlling its movement. Therefore, there are at least nine other flight control computers similar to that depicted in FIG. 3 in a typical airplane, each receiving instructions from the same pilot's input.

Flight control computer 302 also receives information, through ARINC 629 bus 320, from IMA 310. IMA 310 sends data such as altitude, attitude, speed, and heading to flight control computer 302. IMA 310 receives that data from various sensors throughout the airplane, such as navigation sensors 314 and general sensor 318. IMA 310 also generates output for displays 312. Displays 312 indicate to the pilot, for example, the airplane's attitude, altitude, air speed, and heading. IMA 310 also generates instructions for use by autopilot 316. Autopilot 316 flies the airplane by activating servo-motors on the pilot's control to simulate a pilot moving the controls. An airplane may be flown by an autopilot when the airplane is at cruising speed and altitude. Autopilot 316 also directs the servo-motors on the pilot's control to provide feedback to the pilot. In a fly-by-wire airplane, the controls are not directly linked to the flight control surfaces. Therefore, the servo-motors controlled by the autopilot generate movement in the pilot's control to simulate the feedback of a traditional airplane.

Flight control computer 302 performs several different functions in translating the pilot's inputs into actuator movements. For example, an airplane responds differently at different airspeeds. At slow speeds, the ailerons must move a great deal in order to roll the airplane. In fact, at some slow speeds, the ailerons lack the authority to roll the airplane alone and the spoilers must also be used to roll the airplane. At higher speeds, only a small amount of aileron movement is needed to roll the airplane the same amount. The same is true with the pitch control of the elevator: more elevator movement is needed at lower speeds to generate a particular amount of pitch. Flight control computer 302 adjusts these differences due to airspeed and enables the airplane to behave similarly at all air speeds. For example, for an airplane traveling at 200 knots, moving the control stick all the way to the rear may result in the elevators moving up 30 degrees, causing the airplane to pitch up at a certain angle. For an airplane traveling at 400 knots, an elevator movement of 30 degrees may severely damage the airplane. Therefore, the flight control computer 302 adjusts the operation of the elevator: moving the control stick all the way to the rear may result in the elevators moving up only 5 degrees at 400 knots, but the resulting pitch of the airplane is identical to an elevator movement of 30 degrees at 200 knots. In other words, flight control computer 302 senses the airspeed of the airplane and changes the behavior of the control surfaces depending on that airspeed. A similar adjustment can be made based on altitude: an airplane should not be pitched downward at a severe angle if the airplane is 500 feet above the ground. Flight control computer 302 can prevent the pilot from pitching the aircraft downward at a severe angle at certain altitudes.

Flight control computer 302 can also be configured to maintain a constant airspeed. For example, a different configuration of flaps and slats can result in increased drag, slowing the airplane. If such a slowing is not desired, flight control computer 302 can be configured to increase the throttle to the engines or change the pitch in the airplane to maintain the same airspeed, without any additional input from the pilot.

FIG. 3 shows that flight control computer 302 is full-time critical in the prior art fly-by-wire systems. If flight control computer 302 were to fail for any reason, all fly-by-wire functionality would be lost and the pilot would have no control over the primary flight control surfaces. The pilot would have to rely on a mechanical backup to fly the airplane.

Figure 4:
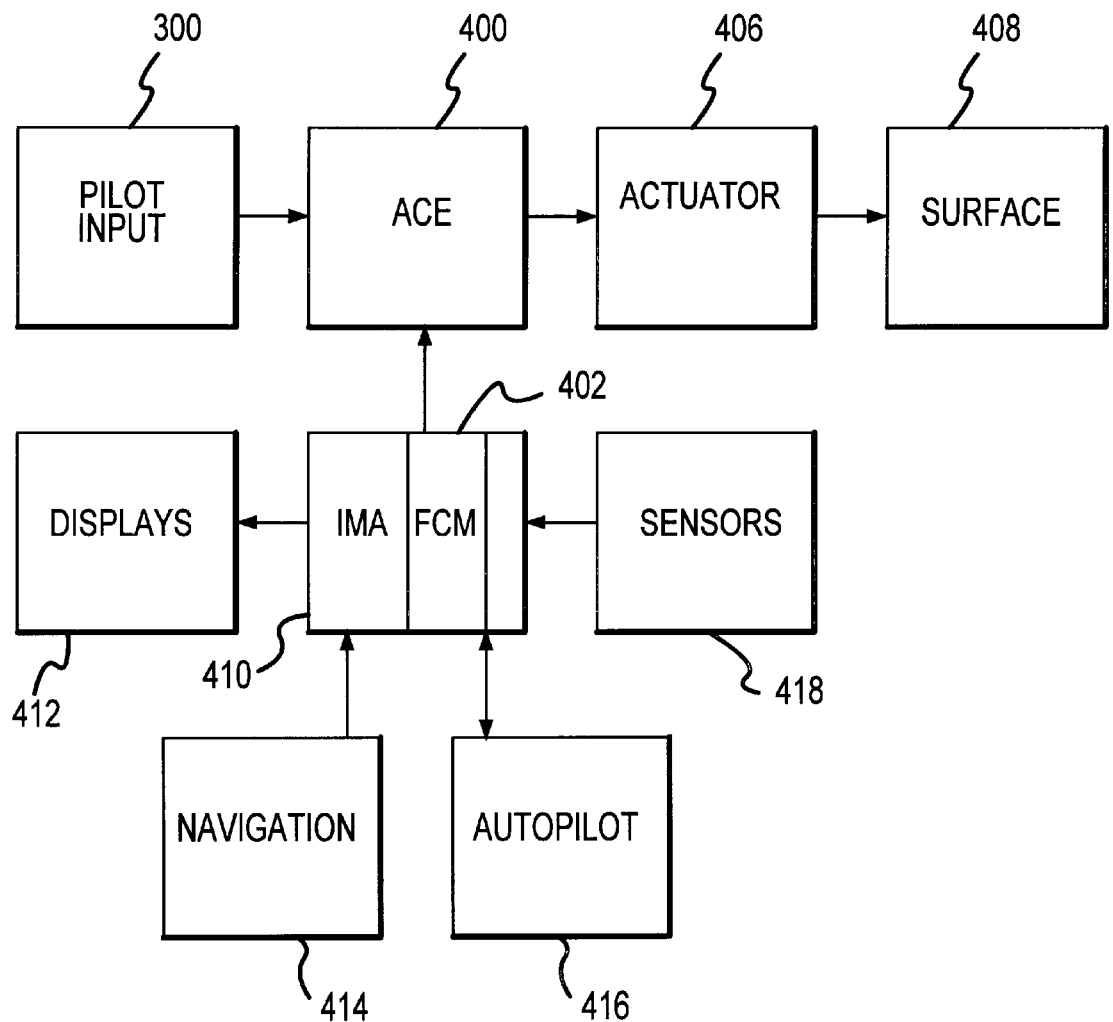
FIG. 4 depicts an embodiment of the present invention Integrated Modular Avionics unit in block diagram format.

The system of an embodiment of the present invention is illustrated in FIG. 4. Pilot inputs 300 are identical to those shown in FIG. 3. The inputs are then transmitted to actuator control electronics ("ACE") 400. ACE 400 also receives inputs from flight control module (FCM) 402. ACE 400 directs actuator 406 to control flight control surface 408.

FCM 402 adds the functionality described above with respect to augmentation to ACE 400. The FCM provides augmentation to the pilot's direct commands by introducing signals to the direct commands which smooth the flight of the airplane. The augmentation features of FCM 402 are more fully detailed in co-pending U.S. patent application entitled "A Method For Providing Command Augmentation To A Command Lane Within A Vehicle" filed Jul. 14, 2000 as Ser. No. 09/616,934. Briefly, FCM 402 ensures a smooth flight by allowing the airplane to behave identically in different situations.

The FCM provides stability augmentation, configuration augmentation, and thrust augmentation. Stability augmentation is when the FCM makes small adjustments to smooth the flight. For example, the airplane might not fly straight and smooth due to certain weather conditions. The airplane may porpoise, in that its pitch and altitude are constantly changing. The FCM can sense this condition and continually send signals to the elevators to counteract those tendencies and ensure a smooth, level flight.

Configuration augmentation allows the airplane to behave identically, from the pilot's point of view, regardless of the configuration of the airplane, for example, whether the flaps are in or they are extended. Normally, when the flaps are extended, the lift of the airplane increases, the pilot must adjust for the increased lift by adjusting the elevators such that the airplane remains at the same altitude. The pilot of an augmented airplane need not nose down because the airplane compensates for the different configuration of the airplane.

Thrust augmentation automatically adjusts the thrust produced by the engines to maintain a constant speed. For example, less thrust is needed when the airplane is pitched down than when the airplane is flying level. This adjustment can be made automatically by the FCM.

ACE 400 differs from actuator control unit 304 of FIG. 3. While ACE 400 is capable of controlling flight control surface 408 without any additional input apart from the pilot's input 300, actuator control unit 304 cannot control primary flight control surface 308 without input from flight control computer 302. In this manner, even in the event of a failure of FCM 402, ACE 400 is able to control flight control surface 408 and thus direct the airplane.

The airplane thus has the benefits of the FCM's augmentation to the pilot's direct commands, yet the airplane is not solely dependent on the FCM. In the embodiment depicted in FIG. 4, in the event of a failure of FCM 402, pilot input 300 is still translated into movements of flight control surface 408 by ACE 400. When flight control surfaces 408 receive their inputs from pilot input 300 without any augmentation from FCM 402, the airplane is said to be in "Direct Mode." Thus, the airplane has two flight modes, the normal mode in which FCM 402 provides augmentation to the pilot's inputs and the direct mode in which the pilot's inputs are supplied to the actuator without augmentation. In direct mode, the flight characteristics of the airplane are less smooth. However, the pilot is still controlling the movements of the airplane's primary control surfaces.

A failure of FCM 402 is not capable of causing catastrophic effects over the full flight. Therefore, FCM 402 is not full-time critical: a failure of FCM 402 is not going to lead to the loss of the aircraft because of the presence of ACE 400, which can provide control of the primary control surfaces in direct mode. Because FCM 402 is not full-time critical, it can be placed in IMA 410 with other components that are not full-time critical.

Because ACE 400 is analog, it is considered deterministic because one can analyze all the characteristics that an analog circuit can have. Thus, ACE 400 can be "thoroughly analyzed." Therefore, there is no need for similar redundancy.

Thus, the present invention changes the functions of the FCM such that the FCM is no longer full-time critical.

Because FCM 402 is not full-time critical, there is no need for similar redundancy. As discussed above, similar redundancy is only needed for full-time critical components. therefore, the software for FCM 402 only needs to be developed once. Furthermore, there is no need for an additional processor unit. In fact, FCM 402 can share processing capabilities with the other avionics units located in IMA 410. In addition, there is no need for a separate, bulky FCC 302. Because of the prior art processors in FCC 302, there is a need for stronger power supplies and cooling capabilities. In contrast to the prior art, the present invention does not require a separate power supply for FCM 402 because it uses the power supply of IMA 410.

In addition, FCM 402 receives its avionics data directly from the Aircraft Standard Communication Bus (ASCB) that is located in IMA 410. The ASCB has a higher bandwidth and transmits data much faster than the external ARINC 629 bus. Additionaly, FCM 402 has access to all of the information present on the ACSB. The availability of an increased amount of information provides many benefits during the certification of an airplane.

Prior to the certification of an airplane, the airplane is taken through many different situations to determine if the airplane adequately handles those situations. Sometimes, during an airplane's certification process, the test pilot determines that the airplane needs adjustments during certain situations. For example, the airplane may react oddly if the airplane is quickly transitioned from a high altitude (with a lower temperature and air pressure) to a low altitude. This condition must be adjusted before the airplane can be certified. These adjustments often require information from the avionics systems to be distributed to the Flight Control Computer. In the prior art, if that information was not already being transmitted to FCC 302 because of the limited bandwidth available, the designers must change the information that is sent over the ARINC 629 bus to the FCC. Only then can the designers modify the software (twice, once for each of the redundant systems) to identify the condition and correct the behavior. Thus, the designers must change both the output from the IMA to output the needed data, often resulting in the elimination of the transmission of another piece of data. In contrast, if the FCM is located in the IMA, the FCM has access to all of the data in the IMA. The designers need only modify the software (once) to react to the particular condition.

The invention disclosed results in a fly-by-wire system with equal or better safety than the previous fly-by-wire systems. However, this fly-by wire system can be developed for a much lower cost than previous systems because the software only needs to be developed once. The incorporation of the flight control module into the integrated modular avionics also results in a weight savings. A separate flight control computer requires a separate housing, with a separate power supply and cooling fans for the processors. The weight of a separate flight control computer is more than 20 pounds. In contrast, the present invention requires only a module to be placed in an IMA. There is no need for a separate cabinet, power supply, or processors, because the module shares those resources with the IMA. Because there is at least one flight control computer for each primary flight control surface and there are typically five primary flight control surfaces on an airplane, the resulting savings can easily surpass 100 pounds. For an airplane which uses two actuators for each primary flight control surface, the weight savings would be doubled because each actuator is coupled to a flight control computer.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the principle, the integration of a flight control computing system into the integrated modular avionics, is followed.

We claim:

1. An fly-by-wire control system comprising,
   an integrated modular avionics unit;
   an actuator control electronics system;
   a hydraulic actuator; wherein
   said integrated modular avionics comprises
      a power supply;
      a processor;
      a plurality of inputs accepting sensor data from various sensors located throughout an aircraft; and
      a flight control module configured to process incoming flight control data and output various flight control data, wherein
         said flight control module is coupled to an actuator control electronics system which is external to said flight control module; and
         said actuator control electronics system is configured to operate a hydraulic actuator coupled to one primary flight control surface.

2. The fly-by-wire control system of claim 1 wherein,
   said flight control module provides augmentation information to said actuator control electronics system.

3. The fly-by-wire control system of claim 2 wherein,
   said actuator control electronics system is coupled to a control stick operated by a pilot; and wherein
   said actuator control electronics system contains a mode of operation wherein said actuator control electronics system operates said flight control surface based on the movements of said control stick without reference to said augmentation information from said flight control module.

4. The fly-by-wire control system of claim 2 wherein,
   said actuator control electronics system contains a mode of operation wherein said actuator control electronics system operates said flight control surface based on the movements of said control stick in conjunction with said augmentation information from said flight control module.

* * * * *